United States Patent
Krause et al.

[11] Patent Number: 6,131,336
[45] Date of Patent: Oct. 17, 2000

[54] VENTILATOR DEVICE HAVING A CONTROL WHICH OPERATES A LAMELLA UNIT AND AN AIR DAMPER SIMULTANEOUSLY

[75] Inventors: Reinhard Krause, Marktredwitz-Brand; Herbert Meyer, Waldershof, both of Germany

[73] Assignees: Fickenscher & Co. GmbH; Werkzeug- und Formenbau, both of Selb, Germany

[21] Appl. No.: 09/109,121

[22] Filed: Jun. 30, 1998

[30] Foreign Application Priority Data

Jul. 3, 1997 [DE] Germany .................. 197 28 305

[51] Int. Cl.[7] .................. F24F 13/06; F24F 13/14
[52] U.S. Cl. .................. 49/74.1; 49/73.1; 49/90.1
[58] Field of Search .................. 49/73.1, 74.1, 49/371, 90.1; 454/155, 325, 322

[56] References Cited

U.S. PATENT DOCUMENTS

| | | | |
|---|---|---|---|
| 2,894,444 | 7/1959 | Boylan et al. | 454/155 |
| 4,887,520 | 12/1989 | Bauer | 454/155 |
| 5,063,833 | 11/1991 | Hara et al. | 454/152 |
| 5,069,112 | 12/1991 | Takayama et al. | 454/162 |
| 5,120,272 | 6/1992 | Soethout et al. | 454/155 |
| 5,470,276 | 11/1995 | Burnell et al. | 454/155 |
| 5,690,550 | 11/1997 | Mikowski | 454/155 |

FOREIGN PATENT DOCUMENTS

| | | | |
|---|---|---|---|
| 2701816 | 7/1978 | Germany | 454/155 |
| 58-174011 | 10/1983 | Japan | 454/155 |
| 59-70813 | 5/1984 | Japan | 454/155 |
| 60-243441 | 12/1985 | Japan | 454/155 |
| 62-13955 | 1/1987 | Japan | 454/155 |
| 62-190351 | 8/1987 | Japan | 454/155 |

*Primary Examiner*—Blair M. Johnson
*Assistant Examiner*—Gregory J. Strimbu
*Attorney, Agent, or Firm*—Jordan and Hamburg LLP

[57] ABSTRACT

An apparatus for controlling the flow of air in an air duct structure includes a lamella unit in the air duct structure moveable between a plurality of positions for controlling the flow of air in the air duct structure. A rocking lever having a groove is pivotally mounted on the air duct structure for pivotal movement about a pivotal axis. The lamella unit has an engageable part disposed in the groove to provide an operable connection between the lamella unit and the rocking lever such that pivoting of the rocking lever about the pivotal axis effects movement of the lamella unit between the plurality of positions. An adjusting element is provided for effecting pivotal movement of the rocking lever about the pivotal axis. An air damper is also pivotally mounted in the air duct structure upstream of the lamella unit for movement between a closed position and an open position, and an operable connection is provided between the air damper and the rocking lever effecting movement of the air damper between the closed and open positions when the rocking lever moves the lamella unit between the closed position and the plurality of open positions.

18 Claims, 5 Drawing Sheets

VENTILATOR DEVICE HAVING A CONTROL WHICH OPERATES A LAMELLA UNIT AND AN AIR DAMPER SIMULTANEOUSLY

BACKGROUND OF THE INVENTION

The invention relates to a system of lamellas for ventilation devices to control the flow of air, particularly for ventilating motor vehicles, with several lamellas, the movement of which is coupled and which can be moved by actuating a preferably manual adjusting element for opening and closing an air duct, the lamellas being in operative connection with the adjusting element by way of a cog, which engages a guiding groove that can be moved by actuating the adjusting element.

Such systems of lamellas are known in the art and find use preferably in motor vehicles in the area of the dashboard. With them, it is possible to regulate the ventilation of the interior of the vehicle individually by opening and closing the lamellas, it being possible to move the lamellas between a closed, first end position and an open, second end position. Starting from the closed position, the lamellas are swiveled open continuously until they reach the completely open position, it being possible occasionally to swivel the lamellas further to guide the air stream in a different direction. In the case of known systems, the lamellas can be swiveled in such a manner, that a laterally protruding cog, which engages a guiding groove that can be actuated by the adjusting element, is provided at a bracket coupling the movement of the lamellas. The guiding groove is moved by means of the adjusting element. This causes the cog to travel in the guiding groove. If the guiding groove is shaped appropriately, the bracket, coupling the motion and, with that, the lamellas, are moved. In the state of the art, a manually actuated rotating wheel, which can be rotated between two end positions, which define the respective end positions of the lamellas, is usually used by the driver or passenger as adjusting element. In the case of a known system of lamellas, as used, for example in the "Passat" series of Volkswagen vehicles or the 7 series of BMW vehicles, a sun-and-planet gear is disposed on the inside of the rotating wheel, the sun-and-planet gear interacting with a disk, which is also fixed to the rotating wheel and has a guiding groove. If the rotating wheel is now moved, the rotational movement is transferred over a first ring gear, fixed to the rotating wheel, to a positionally stationary gear wheel, which in turn meshes with an internal ring gear of said disk having the guiding groove. In this way, the rotary movement of the rotating gear is transferred to the guiding groove. It is an obvious disadvantage of this known system that, for transferring the rotational movement, an extremely complicated sun-and-planet gear is required. which consists of the two ring gears of the rotating wheel and of the disk with the groove, as well as of the coupling planet wheel. That this results in installation difficulties is obvious. Furthermore, the number of parts required is appreciable. A further striking disadvantage consists therein that, for swiveling the lamellas completely from the closed first end position to the open second end position, it is necessary to rotate the rotating wheel several times over that part of its surface, which can be taken hold of by the actuator; this means that it must be grasped repeatedly in order to carry out the complete movement. This is the result of the quasi indirect coupling by means of the sun-and-planet gear and is disadvantageous for the actuator especially while driving, since the driver must concentrate on this.

SUMMARY OF THE INVENTION

It is therefore an object of the invention to provide a system of lamellas of the type given initially, the construction as well as the ease of handling of which is improved.

This objective is accomplished by a system of lamellas with the distinguishing features given initially owing to the fact that the guiding groove is constructed at a rocking lever, which can be moved by means of the adjusting element.

It is a particular advantage of the inventive system of lamellas that a sun-and-planet gear is not used. Instead, it is sufficient to use a simple rocking lever, which has the guiding groove and can be moved by means of the adjusting element, as will still be described in the following. The inventive form of coupling the movement requires significantly fewer parts, namely only the rocking lever, in contrast to the many appropriately configured components required in accordance with the state of the art. Moreover, pursuant to the state of the art, a second guiding groove, which is engaged by a cog disposed in a protruding manner at the rocking lever, can be constructed at the adjusting element, which can be actuated manually as well as, of course, also electrically or pneumatically, for example. For this embodiment of the invention, the adjusting element is a component separate from the rocking lever. A rotating wheel, a pivoting arm or a slide can be used pursuant to the invention as the manually actuated adjusting element. This is so particularly because the inventive construction offers the appreciable advantage that the movement coupling between the adjusting element and the rocking lever leads to an actuating path for moving the lamellas between the two end position, which is much shorter than is the case in the state of the art. After all, it is sufficient to rotate or swivel the adjusting element, constructed, for example, as rotating wheel or as a swiveling arm, by less than 90°, in order to pass through all the positions of the lamellas. This means that the actuator can adjust the lamellas to any possible position with only a single flick of the wrist.

Alternatively to the construction of the adjusting element as a component separate from the rocking lever and the appropriate configuration with the second guiding groove, which causes the rotational movement to result in a directionally opposite movement of the lamellas, provisions can be made in accordance with an advantageous further development of the invention, that the adjusting element, constructed as a swiveling arm or as a slide, is disposed as an extension of the rocking lever and is firmly connected with this, preferably in one piece. After all, the inventive design with the rocking lever permits an extremely short actuating path and thus offer the possibility of undertaking the movement of the lamellas by engaging the appropriately extended rocking lever directly.

Above all in the automobile sector, a system of lamellas is usually used in such a manner, that it is connected to an air duct, which is connected with air inlet openings, which are disposed at an appropriate position and communicate with the surroundings, a blower also being interposed generally. In order to take care of a better control, an air damper is disposed upstream from the lamellas at times in the state of the art. In the state of the art also, the air damper can also be moved simultaneously with the lamellas when the adjusting element is actuated. In order to realize this possibility also for the inventive system of lamellas, provisions have been made in accordance with an appropriate further development of the invention to couple the rocking lever with an air damper, which is pivotably disposed in the air duct upstream from the lamellas in such a manner that, when the lamellas are moved out of or into the closed position, the air damper is opened or closed. In the case of the inventive system of lamellas, the coupling of the movement of the lamellas as well as of the air damper is realized advantageously by means of the rocking lever. This means that, in contrast to the state of the art, for which a plurality of different components are required, the invention provides complete coupling of the movements with only one component. Moreover, pursuant to the invention, the coupling of the movement can be such that the air damper is opened completely when the adjusting element is moved over a first distance and remains in the open position when the adjusting element is moved further for the further movement of the lamellas. This inventive form of the coupling of the movements makes it possible that, at the start of the opening motion of the lamellas, the air damper is opened already completely with a relatively short path of motion, so that sufficient air is supplied to region of the lamellas, even when the latter are opened only slightly. Moreover, for coupling the movements, a third guiding groove can be provided, which is formed at the rocking lever and engaged by a cog coupled with the air damper. To make possible the above-described special type of coupling of the movement of the air damper, the guiding groove can be essentially L-shaped and have a first and a second section. The cog, disposed at the lever arm of the air damper eccentrically to the pivoting axis, is guided in the first section and subsequently in the second section during the opening process of the air damper.

It has proven to be particularly advantageous, particularly with respect to keeping the overall size as small as possible, if the rocking lever can be moved about an essentially centrally extending pivoting axis and the first and/or third guiding groove is disposed at the respective end regions of the rocking lever. Finally, in order to increase the compactness of the system further, particularly with respect to the construction of an independent, complete component, which can be inserted completely in the dashboard or the like, provisions are furthermore made within the scope of the invention that the lamellas, the adjusting element, the rocking lever and optionally also the air damper are disposed on a common housing forming the air duct. Furthermore, at the rocking lever itself, a recess or opening is provided, through which the axle of rotation or pivoting of the adjusting element, particularly the axle of rotation of the rotating wheel, which is mounted on the housing, passes.

So that the driver or passenger can also find the adjusting element effortlessly in the dark, it would be desirable, if this could be illuminated appropriately. In order to take this into account, provisions are made in accordance with a further advantageous development of the invention so that the adjusting element is formed completely or partly (for example, only in the region of a symbol or the like provided thereon) of a transparent material, particularly a plastic, so that it is possible, by means of a lighting device, such as a small incandescent lamp, disposed in the region of the adjusting element, to couple light into the (partially) transparent adjusting element, so that this shines on the side facing the interior of the vehicle. In this connection, especially the use of a rotating wheel in the inventive system of lamellas offers an appreciable advantage, since a sun-and-planet gear no longer is integrated in the rotating wheel here and, instead, this region can be utilized appropriately otherwise. For this purpose, provisions can furthermore be made pursuant to the invention so that the adjusting element, constructed as a rotating wheel, has a recess, which can be engaged by the lighting device, for accommodating a lighting device at the side facing the rocking lever, so that the rotating wheel can be illuminated from the inside. The accommodation can be constructed as an essentially circular depression, in which only the guiding groove still remains, or as an appropriate, longitudinal recess or the like resulting from the rotational movement.

Further advantages, distinguishing features and details of the invention arise out of the example described in the following, as well as in connection with the drawings.

DESCRIPTION OF THE PREFERRED EMBODIMENTS

Figure 1:
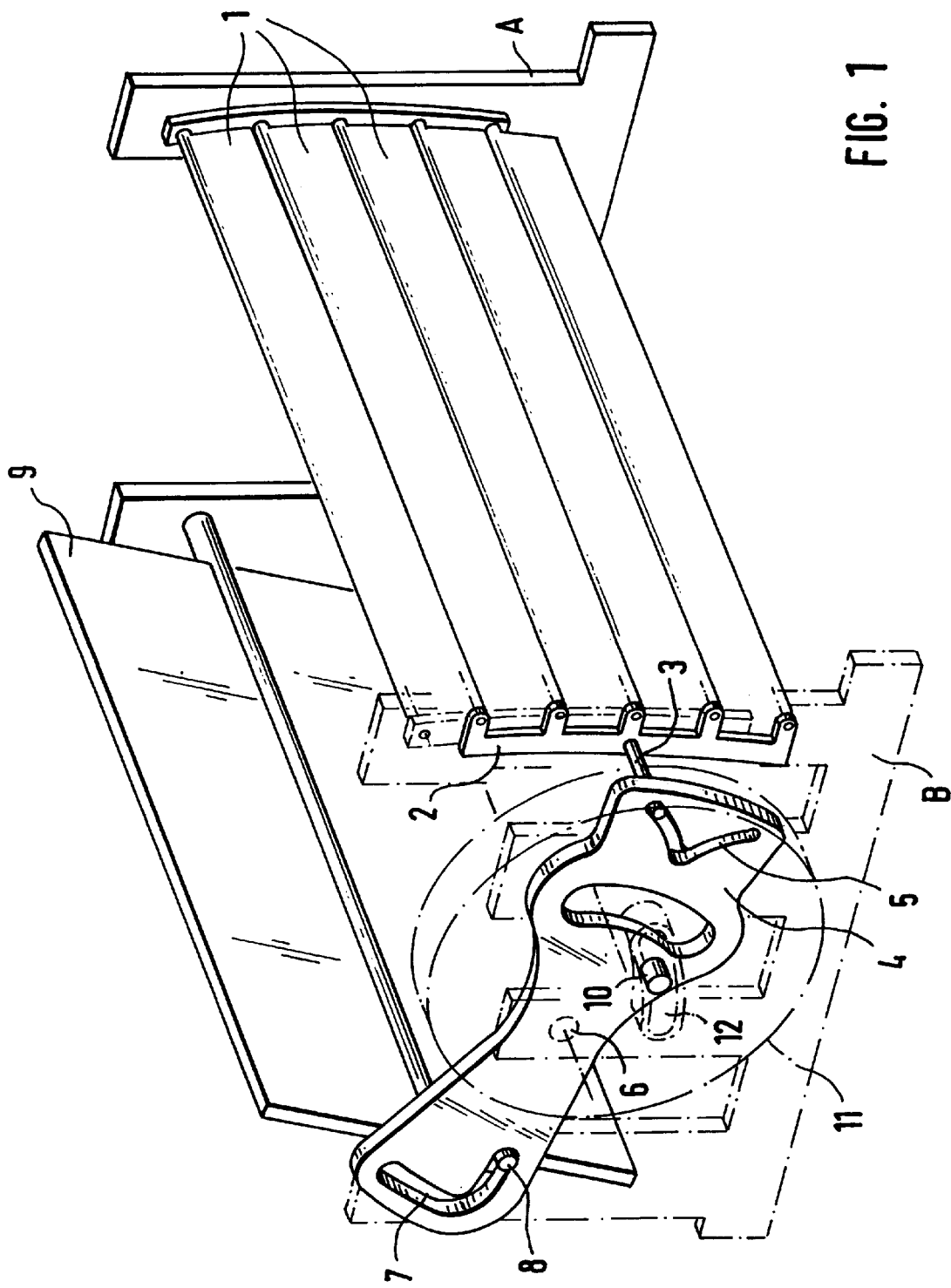
FIG. 1 shows a perspective view of an inventive system of lamellas.

FIG. 1 shows a perspective view of the inventive system of lamellas. For the sake of greater clarity, a closed housing, forming the air duct, is not shown. Instead, only appropriate holding side walls A, B for the elements, which will still be described further below, are shown. When the system of lamellas is used, for example, for ventilating motor vehicles, the whole of the mimicry shown is disposed in or on a housing, which is closed and forms the air duct.

The inventive system of lamellas consists of several lamellas 1, the movement of which is coupled together by means of a comb-like bracket 2, to which the lamellas are linked. At the bracket 2, a laterally protruding cog 3 is disposed. This cog 3 engages a rocking lever 4, which extends, in the example shown, next to the side walls B (if a closed housing were present, the rocking lever would lie outside of the housing along the wall). The cog 3 engages a guiding groove 5, which is formed at the rocking lever 4 and is essentially V-shaped. The cog 3 travels in this groove in a manner still to be described and thus makes a movement of the bracket 2 possible. The lamellas, following the movement of the bracket 2, themselves move correspondingly. The rocking lever 4 is mounted once again on the side wall B (corresponding to the housing) so that is can swivel about a rigid axle 6. The rocking lever 4 is extended beyond the fulcrum and, at its other end, has a third guiding groove 7, which is essentially L-shaped. This third guiding groove 7 is engaged by a further cog 8 of an air damper 9, which is disposed in the air duct and serves to close the latter (in the closed housing, this air damper, in the position shown in FIG. 1, would seal off completely the air duct formed on the housing side). Due to this cog-groove connection 7, 8, the movement of the air damper 9 is coupled with that of the rocking lever 4. A further cog 10, which protrudes laterally, is formed at the rocking lever 4. This cog 10 engages a second guiding groove 12, which is formed at an adjusting element in the form of a rotating wheel 11. The rotating wheel 11 is the handling element, which is to be actuated by the operator and over which the position of the lamellas and the air damper can be changed or adjusted. It is evident that, as a result of the different cog-groove connections, a complete coupling of motions is realized between the rotating wheel 11 the rocking lever 4 and the lamellas 1 or the air damper 9.

Figure 2:
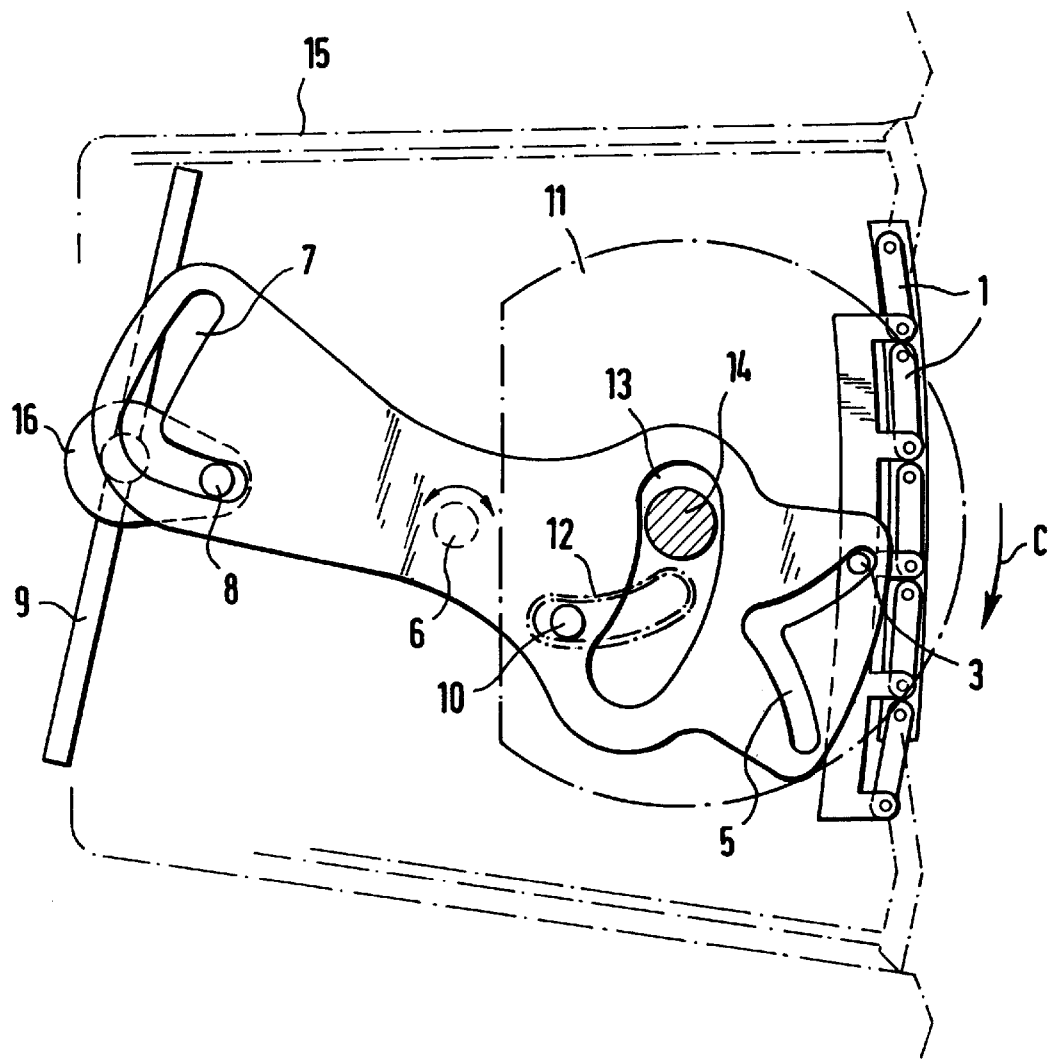
FIG. 2 shows a side view of the system of lamellas of FIG. 1, showing the rocking lever, the lamellas being closed.
Figure 3:
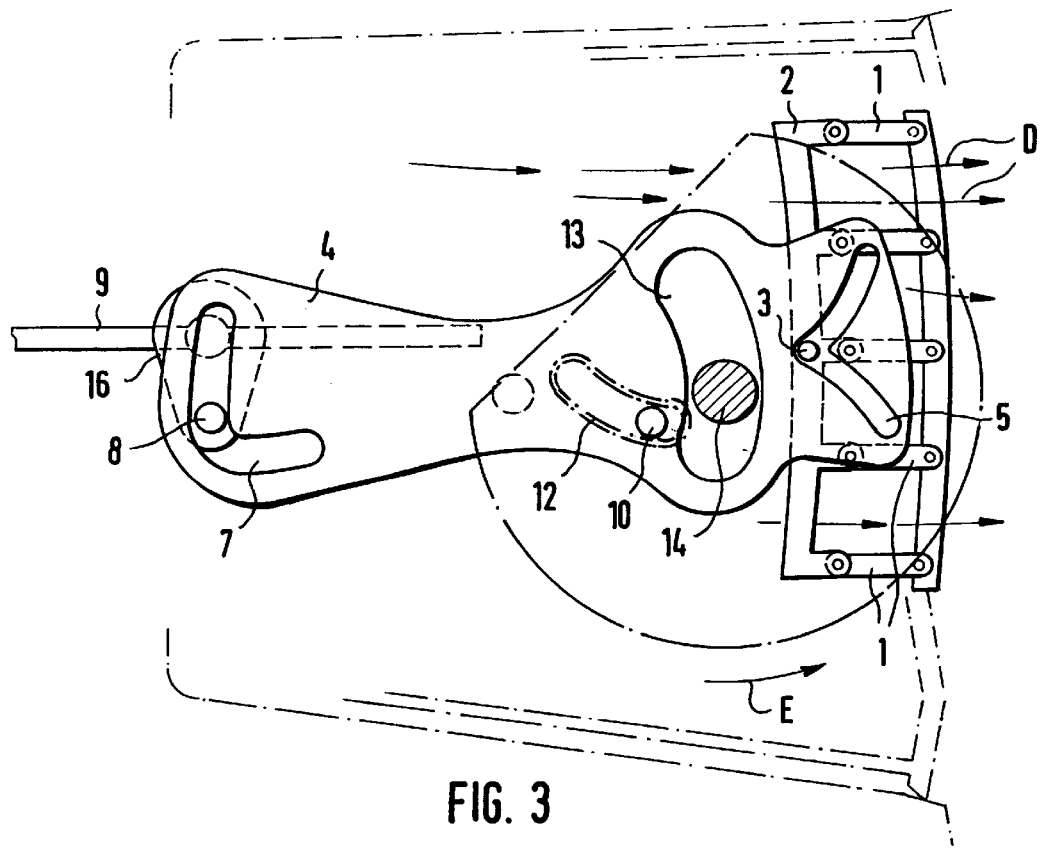
FIG. 3 shows a view, similar to that of FIG. 2, with a rocking lever position with open lamellas.
Figure 4:
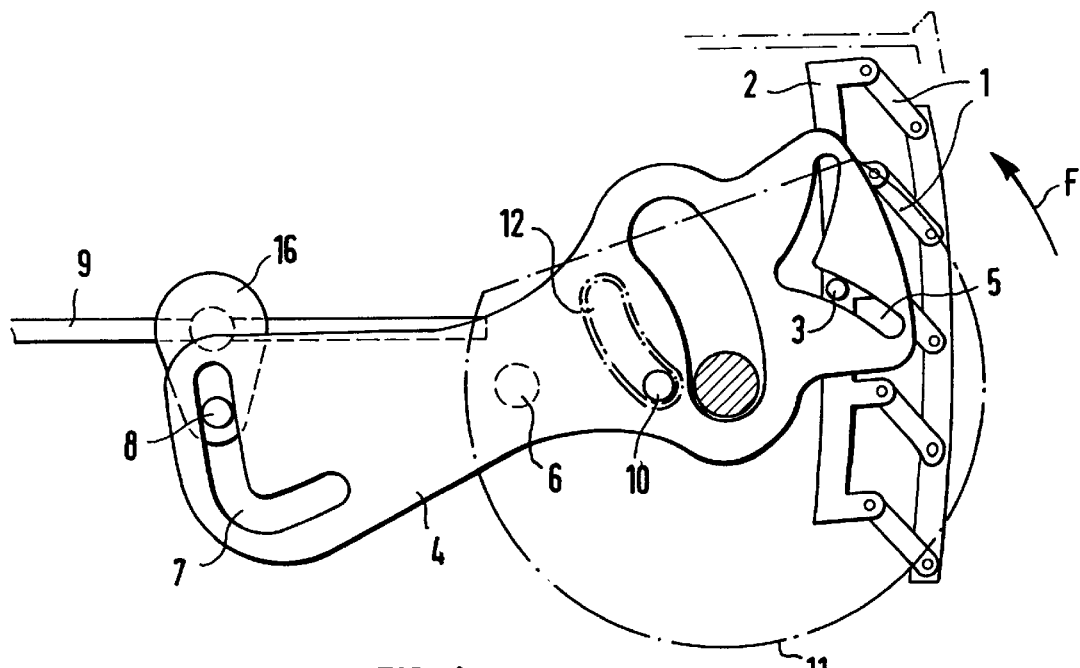
FIG. 4 shows a view of the rocking lever position during further pivoting, the lamellas being in the second end position.

FIGS. 2 to 4 show the mode of functioning of the inventive system of lamellas and the coupling of the motions in detail. Moreover, the position of the rocking lever and of the rotating wheel, as well as the components to be moved, are shown in FIG. 2, which corresponds to the closed position of the lamellas. For the sake of greater clarity, the rotating wheel 11 is shown with a chord section on one side, in order to be able to reproduce the rotational movement and better shown the change in the wheel position. In the initial position, shown in FIG. 2, the cog 3 is in the upper end position of the guiding groove 5. The cog 8 is in the right end position of the guiding groove 7 and the cog 10 finally is in the left end position of the second guiding groove 12. As shown in FIG. 2, a further opening 13, through which the axle of rotation 14 of the rotating wheel 11 passes, is constructed at the rocking lever 4.

If now, for ventilation purposes, the air duct, which is constructed in the housing 15 (shown here by lines of dots and dashes), is to be opened, the rotating wheel 11 must be rotated in the direction of arrow C. This swiveling causes the cog 10 to be guided in the guiding groove 12 of the rotating wheel 11 and carried along to the top, as a result of which the rocking lever 4 is swiveled counterclockwise about its axis of rotation 6. Due to this swiveling, the cog 3 is also carried along at the same time in the first guiding groove 5 and is guided into the groove depression of the V-shaped guiding groove. This guiding causes the bracket 2 to be moved along a circular segment path and to be brought from the position, close to the lamellas, into a remote position shown in FIG. 3, the lamellas 1 being taken along and the air duct opened. The counterclockwise swiveling of the rocking lever 4 furthermore causes the cog 8, which is disposed at a swiveling arm 16 of the air damper 9 eccentrically to the pivoting axis of the latter, to be guided in the third guiding groove in the section of the groove extending essentially horizontally. Moreover, the groove is constructed in such a manner, that a small movement of the rocking lever 4 and, with that, of the rotating wheel 11, already leads to a complete opening of the air damper 9. It is evident that all the movement processes take place synchronously due to the coupling of all elements exclusively on the rocking lever 4. At the same time, as shown by the position of the cut-off side of the rotating wheel 11, only a very small movement of the rotating wheel is required for the swiveling of the lamellas 1 and of the air damper 9 that is shown. The swiveling required for this purpose, which enables, particularly, the lamellas 1 to be opened completely and, with that, air to pass (arrow D) is only insignificantly more than 45°. If now the air duct is to be closed once again, then the rotating wheel 11 would have to be turned back in the opposite direction (arrow E) and the movements would then take place in the reverse manner.

FIG. 4 now shows the position of the rocking lever, when the latter is rotated even further in the direction of arrow C. Starting out from the position shown in FIG. 3, the rotating wheel 11 (compare the position of the cut-off side of the rotating wheel) is swiveled even further, which causes the cog 10 to be guided even further in the guiding groove 12 as far as the end of said groove. Due to the construction of the guiding groove 12, this comparatively short guidance by the groove brings about an appreciably further swiveling of the lever, as is evident from the rocking lever position as well as from the position of the lamellas. This further swiveling causes the cog 3 to be guided further in the guiding groove 5 in the other leg of the V. As a result, the bracket 2 is swiveled even further in the upward direction. The position of the lamellas then causes the air flowing through to be diverted downward, in contrast to the opposite position of the lamellas, which is attained by moving from the position of FIG. 2 to that of FIG. 3. By these means, a fine adjustment of the air flow can be achieved effortlessly. In contrast to the lamellas, the air damper 9 remains completely uninvolved during this further swiveling motion. This is achieved owing to the fact that the cog 8 now is guided in the essentially vertical leg of the third guiding groove 7 and consequently is not moved. The air duct thus remains completely open in every case. If it is now to be closed once again, the rotating wheel 11 must be turned back once again in the direction of arrow F. As shown by a comparison of the positions of the rotating wheel shown in FIGS. 2 and 4, the rotating wheel need only be rotated through less than 90°, in order to move the lamellas I between the two possible end positions.

As is evident from the example described, an adjusting element other than a rotating wheel can also be used. For example, the adjusting element can also be constructed as a rocking lever, which can be swiveled about an axis corresponding to the axis of rotation 14, is provided with a guiding groove corresponding to guiding groove 12 and has an engaging section, which can be actuated from the outside. Alternatively, it is also possible to do without an adjusting element, which is separate from the rocking lever, and to mount such an adjusting element in a direct extension of the rocking lever beyond the plane of the lamellas. In the case of this construction, the lamellas would then be opened by actuating the adjusting element in the opposite direction since in this case there would be no coupling of motions as represented by cog 10 and guiding groove 12, which causes the lamellas to be opened from top to bottom by moving the adjusting element. If the adjusting element is disposed directly on the rocking lever, it would be possible to open in the reverse manner by moving from the bottom to the top.

In the example shown, the rotating wheel 11 may also be provided at its side facing the rocking lever 4 with an appropriate recess in which a lighting element in the form of a lamp or the like can be inserted. This enables the rotating wheel 11, which preferably is manufactured from transparent plastic, to be illuminated from inside. Such a development is possible since, due to the inventive construction of the system of lamellas, no elements other than the guiding groove 12 are required on the rotating wheel and consequently space is available for accommodating the illumination.

Figure 5:
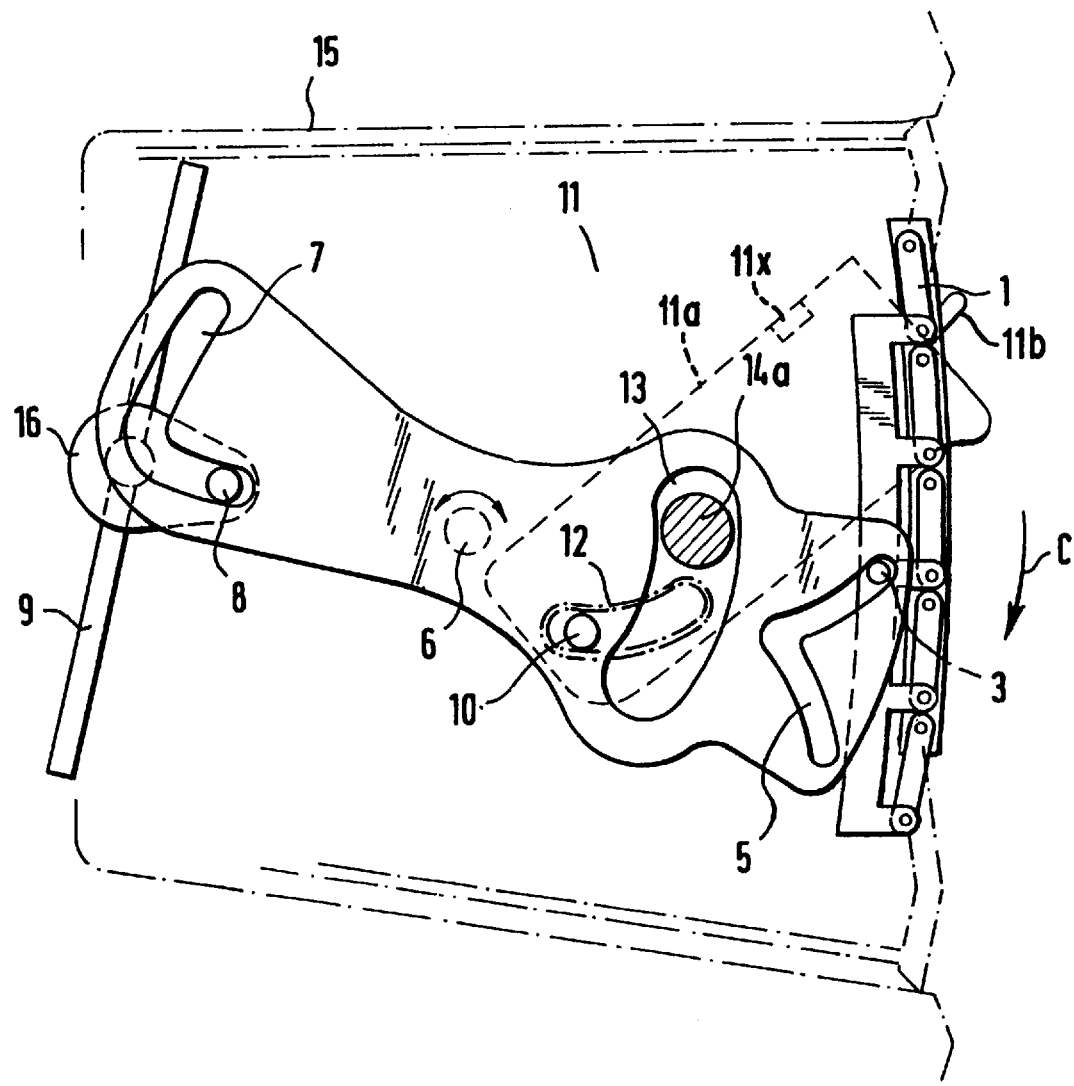
FIG. 5 is a side view, similar to FIG. 2, but showing an alternative embodiment.

With regard to the above, FIG. 5 shows an adjusting element 11a which is used instead of the rotating wheel 11 in the first embodiment. In FIG. 5, the adjusting element 11a rotates about the axis of rotation 14a and includes the groove 12 which is engaged by the cog 10 as in the first embodiment. The adjusting element 11a includes a part 11b which can be manually manipulated by an operator to pivot the adjusting element 11a in the direction C as shown in FIG. 5. The adjusting element 11a may be provided with a recess for a lighting element 11x.

Figure 6:
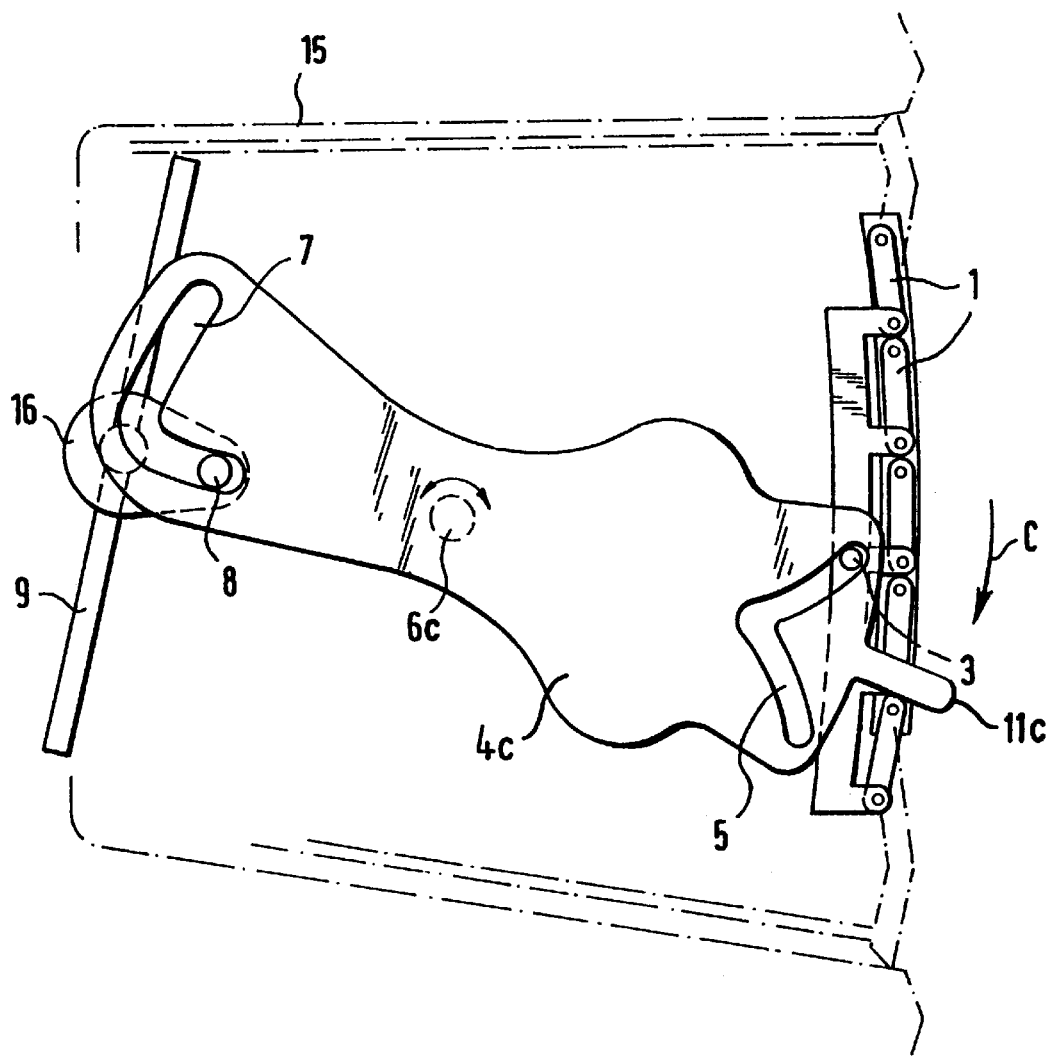
FIG. 6 is a side view, similar to FIG. 2, but showing yet a further alternative embodiment.

In the alternative embodiment of FIG. 6, the adjusting element 11c is fixed to the rocking lever 4c. The adjusting element 11c can be manipulated by an operator to pivot the rocking lever 4c about its pivoting axis 6c in the direction C'. In this embodiment, the adjusting element 11c is fixed to the rocking lever 4c and is not movable relative to the rocking lever as in the other embodiments.

In each of the embodiments where a projection on a first part slides in a groove in a second part, the placement of the projection and the groove may be interchanged so that the projection is on the second part and the groove is in the first part.

What is claimed is:

1. Apparatus adapted for use in controlling the flow of air in an air duct structure comprising:

a lamella unit adapted for use in the air duct structure and moveable between a closed position and a plurality of open positions so as to be adapted to control the flow of air in the air duct structure;

a rocking lever adapted to be pivotally mounted on the air duct structure for pivotal movement about a pivotal axis and operable to move said lamella unit between said closed position and said plurality of open positions, said rocking lever having a groove;

said lamella unit having an engageable part disposed in said groove to provide an operable connection between said lamella unit and said rocking lever such that said pivotal movement of said rocking lever about said pivotal axis effects movement of said lamella unit between said closed position and said plurality of open positions;

an adjusting element for effecting said pivotal movement of said rocking lever about said pivotal axis;

an air damper adapted to be pivotally mounted in said air duct structure upstream of said lamella unit for movement between a closed position and an open position; and an operable connection between said air damper and said rocking lever effecting movement of said air damper between said closed and open positions when said rocking lever moves said lamella unit between said closed position and said plurality of open positions.

2. Apparatus according to claim 1 wherein said adjusting element is adapted to be movably mounted on said air duct structure, said groove in said rocking lever comprising a first groove, said adjusting element having a second groove, said rocking lever having a protruding part disposed in said second groove such that movement of said adjusting element effects said pivotal movement of said rocking lever about said pivotal axis.

3. Apparatus according to claim 1 wherein said adjusting element comprises a manually actuated rotary wheel.

4. Apparatus according to claim I wherein said adjusting element comprises a manually actuated pivotal member.

5. Apparatus according to claim 1 wherein said adjusting element comprises a manually actuated extension part fixed to said rocking lever.

6. Apparatus according to claim 1 wherein said adjusting element is operable to effect said pivotal movement of said rocking lever about said pivotal axis between a closed position and a plurality of operable positions, said operable connection between said rocking lever and said lamella unit effecting positioning of said lamella unit in said closed position when said rocking lever is in said closed position and positioning said lamella unit in one of said plurality of open positions when said rocking lever is in one of said plurality of operable positions.

7. Apparatus according to claim 6 wherein said operable connection between said lamella unit and said rocking lever comprises a first operable connection and said operable connection between said rocking lever and said air damper comprises a second operable connection, wherein when said rocking lever is in said closed position, said air damper is in said closed position and when said rocking lever is in said one of said plurality of operable positions, said air damper is in said open position.

8. Apparatus according to claim 7 wherein said second operable connection comprises a second groove in said rocking lever and an air damper projection on said air damper slidably disposed in said second groove.

9. Apparatus according to claim 8 wherein said air damper has an axis of rotation, said air damper projection being displaced from said axis of rotation, said second groove having a generally L-shaped configuration having a first leg section and a second leg section, said air damper projection being guided in said first leg section when said air damper is moved from said closed position to said open position, said air damper being retained in said open position when said air damper projection is guided in said second leg section.

10. Apparatus according to claim 7 wherein said rocking lever has first and second end portions and said pivotal axis lies between said first and second end portions, said groove is disposed in said first end portion of said rocking lever and said second operable connection including a second groove in said second end portion of said rocking lever.

11. Apparatus according to claim 7 wherein said one of said plurality of operable positions of said rocking lever comprises a first rocking lever operable position, said one of said plurality of open positions of said lamella unit comprises a first lamella unit open position, said first operable connection effecting movement of said lamella unit between said lamella unit closed position and said first lamella unit open position when said rocking lever is moved between said rocking lever closed position and said first rocking lever operable position, said second operable connection effecting movement of said air damper between said closed position and said open position when said rocking lever is moved between said closed position and said first rocking lever operable position.

12. Apparatus according to claim 11 wherein said plurality of open positions of said lamella unit including open positions between said lamella unit closed position and said first lamella unit open position for directing the flow of air from the air duct structure downwardly at an acute angle with respect to a generally horizontal plane, said plurality of open positions of said lamella unit further including open positions for directing the flow of air from the air duct structure upwardly at an acute angle with respect to said generally horizontal plane, and said lamella unit, when in said first lamella unit open position, is adapted to direct the flow of air from the air duct structure generally parallel to said generally horizontal plane.

13. Apparatus operated by an operator adapted to control a flow of air in an air duct structure comprising:

a lamella unit adapted for use in the air duct structure moveable between a plurality of positions for controlling the flow of air in the air duct structure;

an actuating lever adapted to be movably mounted on the air duct structure and moveable between a first position, a second position and a third position;

a first operable connection between said actuating lever and said lamella unit effecting movement of said lamella unit between said plurality of positions upon movement of said actuating lever between said first, second and third positions;

an air damper adapted to be pivotally mounted on the air duct structure upstream of said lamella unit and moveable between a closed position and an open position; and a second operable connection between said air damper and said actuating lever effecting movement of said air damper between said closed position and said open position when said actuating lever is moved between said first and second positions;

said air damper being retained in said open position when said actuating lever is moved between said second and third positions; and an adjusting element for effecting movement of said actuating lever relative to said air duct structure.

14. Apparatus according to claim 13 wherein said actuating lever is adapted to be pivotably mounted on said air duct structure.

15. Apparatus according to claim 14 wherein said adjusting element is fixed to said actuating lever.

16. Apparatus according to claim 14 wherein said adjusting element is adapted to be rotatably mounted on the air duct structure, and further comprising a third operable connection between said adjusting element and said actuating lever.

17. An apparatus adapted to control a flow of air in an air duct structure comprising:

a lamella unit adapted for use in the air duct structure so as to be adapted to control the flow of air in the air duct structure;

a rocking lever adapted to be pivotally mounted on the air duct structure for pivotal movement about a pivotal axis, said rocking lever having a groove;

said lamella unit having an engageable part disposed in said groove to provide an operable connection between said lamella unit and said rocking lever such that said pivotal movement of said rocking lever about said pivotal axis effects movement of said lamella unit;

an adjusting element for effecting said pivotal movement of said rocking lever about said pivotal axis, said adjusting element being operable to move said rocking lever between a closed position and a plurality of operable positions, said lamella unit being moveable between a closed position and a plurality of open positions, said operable connection between said rocking lever and said lamella unit positioning said lamella unit in said closed position when said rocking lever is in said closed position and positioning said lamella unit in one of said plurality of open positions when said rocking lever is in one of said plurality of operable positions;

an air damper adapted to be pivotably mounted on the air duct structure upstream of said lamella unit for pivotal movement between a closed position and an open position; and an operable connection between said rocking lever and said air damper such that when said rocking lever is in said closed position, said air damper is in said closed position and when said rocking lever is moved between said plurality of operable positions, said air damper is maintained in said open position.

18. An apparatus adapted to control a flow of air in an air duct structure comprising:

a lamella unit adapted for use in the air duct structure and moveable to control the flow of air in the air duct structure;

a rocking lever adapted to be pivotally mounted on the air duct structure for pivotal movement about a pivotal axis, said rocking lever having a groove;

said lamella unit having an engageable part disposed in said groove to provide a first operable connection between said lamella unit and said rocking lever such that said pivotal movement of said rocking lever about said pivotal axis effects movement of said lamella unit;

an adjusting element for effecting said pivotal movement of said rocking lever about said pivotal axis, said adjusting element being operable to move said rocking lever between a closed position and a plurality of operable positions, said lamella unit being moveable between a closed position and a plurality of open positions, said first operable connection between said rocking lever and said lamella unit positioning of said lamella unit in said closed position when said rocking lever is in said closed position and positioning said lamella unit in one of said plurality of open positions when said rocking lever is in one of said plurality of operable positions;

an air damper adapted to be pivotably mounted on the air duct structure upstream of said lamella unit for pivotal movement between a closed position and a plurality of open positions, a second operable connection between said rocking lever and said air damper such that when said rocking lever is in said closed position, said air damper is in said closed position and when said rocking lever is in said one of said plurality of operable positions, said air damper is in one of said plurality of open positions;

said one of said plurality of operable positions of said rocking lever comprising a first rocking lever operable position, said one of said plurality of open positions of said lamella unit comprising a first lamella unit open position, another of said plurality open positions of said lamella unit comprising a second lamella unit open position, said one of said plurality of open positions of said air damper comprising an air damper operable open position, said first operable connection effecting movement of said lamella unit between said lamella unit closed position and said first lamella unit open position when said rocking lever is moved between said rocking lever closed position and said first rocking lever operable position, said second operable connection effecting movement of said air damper between said closed position and said air damper operable open position when said rocking lever is moved between said closed position and said first rocking lever operable position;

another of said plurality of operable positions of said rocking lever comprising a second rocking lever operable position, said first operable connection effecting movement of said lamella unit between said first lamella unit open position and said second lamella unit open position when said rocking lever is moved between said first rocking lever operable position and said second rocking lever operable position, said second operable connection maintaining said air damper in said air damper operable open position when said rocking lever is moved between said first rocking lever operable position and said second rocking lever operable position.

* * * * *